(12) United States Patent
Bucchieri

(10) Patent No.: US 8,382,480 B2
(45) Date of Patent: Feb. 26, 2013

(54) APPARATUS AND METHOD FOR PRESENTING AND CONTROLLABLY SCROLLING BRAILLE TEXT

(75) Inventor: Vittorio Bucchieri, Wakefield, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1343 days.

(21) Appl. No.: 11/610,795

(22) Filed: Dec. 14, 2006

(65) Prior Publication Data

US 2008/0145822 A1     Jun. 19, 2008

(51) Int. Cl.
*G08B 6/00* (2006.01)
*G09B 21/00* (2006.01)

(52) U.S. Cl. ........ 434/113; 434/114; 434/115; 434/116; 434/117; 434/118; 340/407.1; 340/407.2

(58) Field of Classification Search .................. 345/167; 434/112–117
See application file for complete search history.

(56) References Cited

U.S. PATENT DOCUMENTS

| | | | | |
|---|---|---|---|---|
| 5,736,978 | A * | 4/1998 | Hasser et al. | 434/113 |
| 5,973,670 | A * | 10/1999 | Barber et al. | 345/157 |
| 6,424,338 | B1 * | 7/2002 | Anderson | 345/173 |
| 6,509,892 | B1 * | 1/2003 | Kamper et al. | 345/173 |

OTHER PUBLICATIONS

Refreshable Braille Displays: http://www.deafblind.com/display.html.
Text-To-Speech, Screen Readers and Symthesizers: http://www.geocities.com/HotSprings/Villa/6113/s_tts2.htm.
Portable Braille Computer: http://www.blazie.co.uk/productsPACMate.htm.
Beth E. Finn and Krista Caudill; Development of a Computer-Based Interpretation System for Deaf-Blind Individuals; http://www.ece.udel.edu/InfoAccess/Publications/spchbrlresna97.html.
Blackberry: http://www.blackberry.com/products/handhelds/demos/blackberry_7500.html.
About TTY: http://www.aboutty.com/.

* cited by examiner

*Primary Examiner* — Nikolai A Gishnock

(57) ABSTRACT

Apparatus and methods for converting data into Braille text and permitting scrolling of a Braille display are provided. Embodiments may include a Braille display configured to present Braille text, a control device configured to allow a user to at least partially control scrolling of the Braille text, communication circuitry configured to transmit and receive data, and a processor that is operably coupled to the Braille display and communication circuitry, wherein the processor is configured to convert at least portions of data received by the communication circuitry into Braille text for presentation by the Braille display. Embodiments may further include a memory for storing Braille text.

21 Claims, 4 Drawing Sheets

APPARATUS AND METHOD FOR PRESENTING AND CONTROLLABLY SCROLLING BRAILLE TEXT

BACKGROUND OF THE INVENTION

Present day communication media often and effectively provides for persons with special needs, including the deaf and the blind. For instance, deaf persons can employ text telephones, videoconferences, and text messaging to communicate with others, while blind persons can use Braille printing and keypads or text-to-speech technology to essentially read text. Also, blind users and deaf users can communicate using mobile phones, by speech and hearing and by vision, respectively. Blind users have learned to use the buttons on the device efficiently thanks to their tactile memory. Of course, deaf users are able to use the keyboards on mobile phones to text message thanks to their sight.

However, persons who are both blind and deaf cannot effectively communicate using present day mobile devices. The mobile devices of today do not provide a way for deaf and blind persons to read text messages or listen to voice messages sent to their mobile devices. Moreover, even if a blind user can hear, there may be instances in which it is inappropriate or undesirable to listen to an audible message. While such a message could be converted to text for a sighted user, a blind user will be unable to receive the message until circumstances change such that the blind user can listen to the audible message.

DETAILED DESCRIPTION

Exemplary embodiments are described hereinafter with reference to the accompanying drawings, in which exemplary embodiments and examples are shown. Like numbers refer to like elements throughout.

Exemplary embodiments relate to methods and apparatus for converting data into Braille text and permitting scrolling of a resulting Braille display of the Braille text. The apparatus is typically embodied in a mobile device, for example, although an apparatus 10 is primarily described herein as a mobile phone, the apparatus 10 may also be a personal digital assistant ("PDA"), or any other personal communication system ("PCS"). The data converted by the apparatus 10 may be of various types including audio data and/or text data. For example, a text message or voice message received by the apparatus 10 may be converted into Braille text. As described below, the apparatus may include a Braille display 28 that presents the Braille text and may be scrolled by a user so that at least selected portions of the converted data may be displayed as Braille text.

Figure 1:
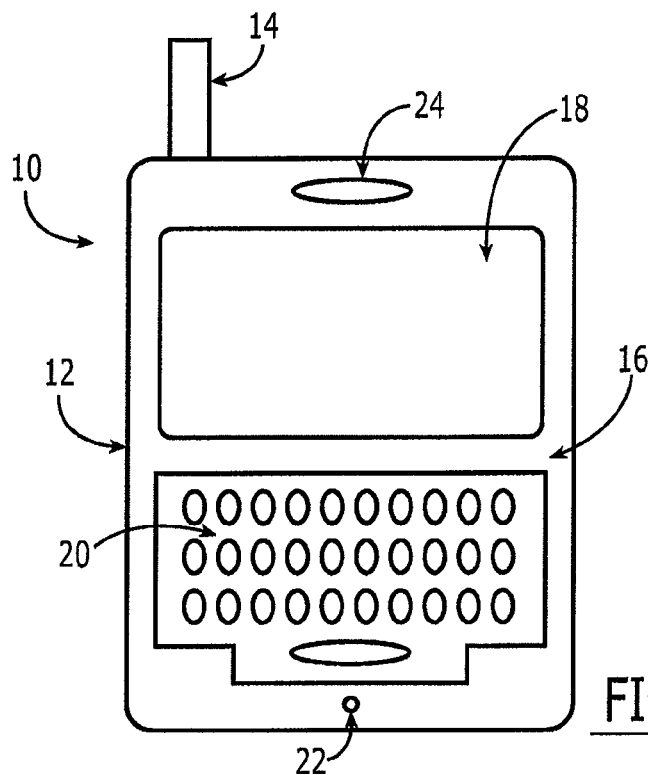
FIG. 1 illustrates a first side of an apparatus according to an exemplary embodiment.

According to the embodiment illustrated in FIG. 1, the apparatus 10 may include a housing 12 having any of various shapes and sizes. The housing 12 may be formed of plastic or other materials and may provide a structure in which other components of the apparatus may be disposed. For example, in FIG. 1, the apparatus includes an antenna 14, screen 18, keyboard 20, microphone 22, and speaker 24 that are exposed by the housing 12. The antenna 14 may be any type that can at least receive data from other sources. While the embodiment of FIG. 1 includes an antenna 14 extending from the housing 12, the antenna 14 may extend from a different portion of the housing 12 or may not extend at all from the housing 12 and be disposed, instead, internally. The screen 18 may also be configured within the housing 12. The screen 18 may be any type of electronic screen configured to display visual data and may be located anywhere relative to the housing 12. As shown in FIG. 1, the keyboard 20 may also be accessible via the housing 12. The keyboard 20 may be any type in which keyboard data entries may be keyed. While the embodiment of FIG. 1 includes a keyboard 20 on a certain portion of the housing 12, the keyboard 20 may be situated on other portions of the housing 12. The microphone 22 may be any device that can receive audible messages. The speaker 24 may be any device that can transmit sound messages. Both microphone 22 and speaker 24 may be situated anywhere relative to the housing 12.

Figure 2:
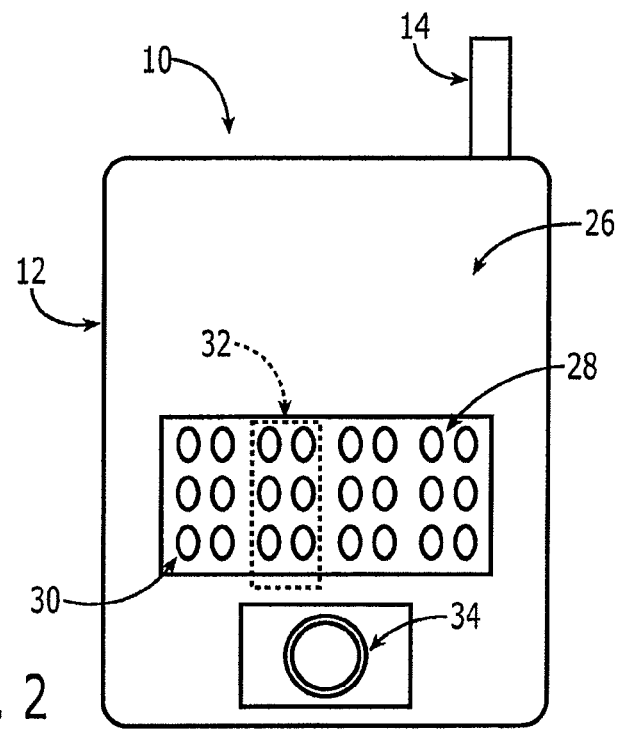
FIG. 2 illustrates a second, opposed side of the apparatus of FIG. 1.

In one embodiment, the housing 12 may have opposing first 16 and second 26 surfaces. FIG. 1 illustrates the first surface 16 of housing 12 and FIG. 2 illustrates the second, opposed surface 26 of housing 12. As seen in FIG. 1, the first surface 16 may include a screen 18, keyboard 20, microphone 22, and speaker 24, while, as seen in FIG. 2, the second surface 26 may include a Braille display 28 and control device 34. The Braille display 28 provides Braille text in a manner to be read by users of the apparatus. Depending upon the configuration, however, the Braille display 28 and/or the control device 34 may be on the first surface 16 of the apparatus and/or some of the components depicted in FIG. 1 to be on the first surface may, instead, be on the second surface 26.

The Braille display 28 may have various sizes and configurations. In one embodiment, the Braille display 28 is comprised of one or more cells 32, each of which represents a respective Braille character. As seen in FIG. 2, the Braille display 28 may include four cells 32 and each cell 32 may include six pins 30. However, the Braille display 28 may include more or less than the four cells 32 shown in FIG. 2. Likewise, the number of pins 30 may be more or less than the six shown for each cell 32. The pins 30 may be controlled so as to selectably protrude outwardly and may be formed of various materials including metal or nylon. The control device 34 may be used to at least partially control scrolling of the Braille text presented by the Braille display 28. For example, in FIG. 2, the control device 34 includes a track ball. It should be noted that other types of control devices 34 may be used to scroll the Braille text, such as a joystick, touchpad or the like.

Figure 3:
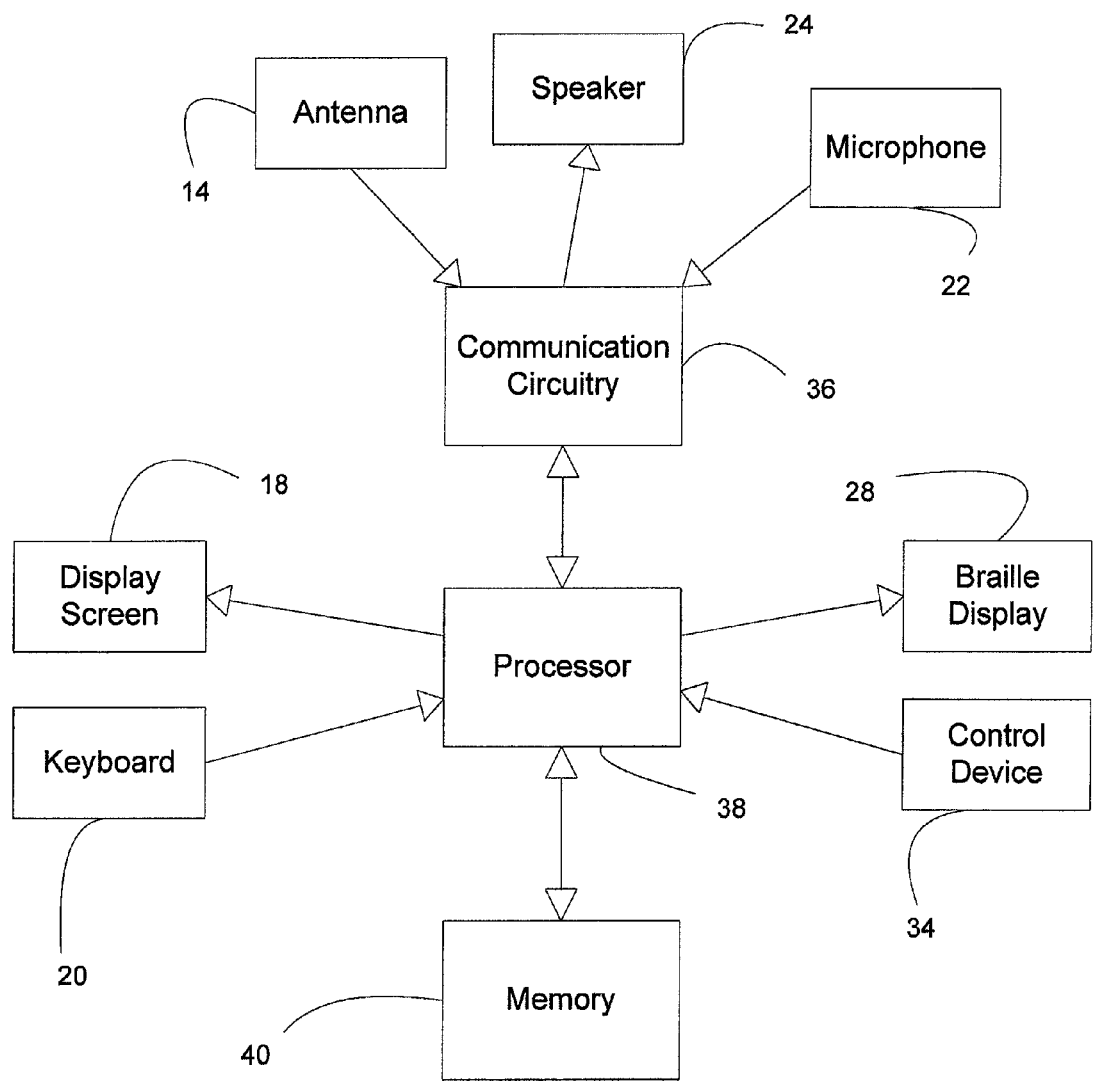
FIG. 3 illustrates a block diagram illustration of an apparatus according to one embodiment.

The apparatus 10 may also include a number of components disposed within the housing. In FIG. 3, for example, the apparatus typically includes communication circuitry 36 that may include a transceiver for sending and receiving signals via the antenna 14 and microphone 22. Communication circuitry 36 may also be coupled with a microphone 22. The apparatus 10 also typically includes a processor 38 such as a microprocessor, application specific integrated circuit (ASIC), controller, or other computing device for performing or directing the various functions of the apparatus, as well as a memory device 40 for storing data as well as software that is executed by the processor 38 to direct its functions. For example, the processor 38 is configured to control the Braille display 28 and, in one example, the pins 30 of each cell 32 to display the desired Braille characters. In addition, the processor 38 is configured to receive user input via the control device and to appropriately scroll the Braille display 28.

Figure 4:
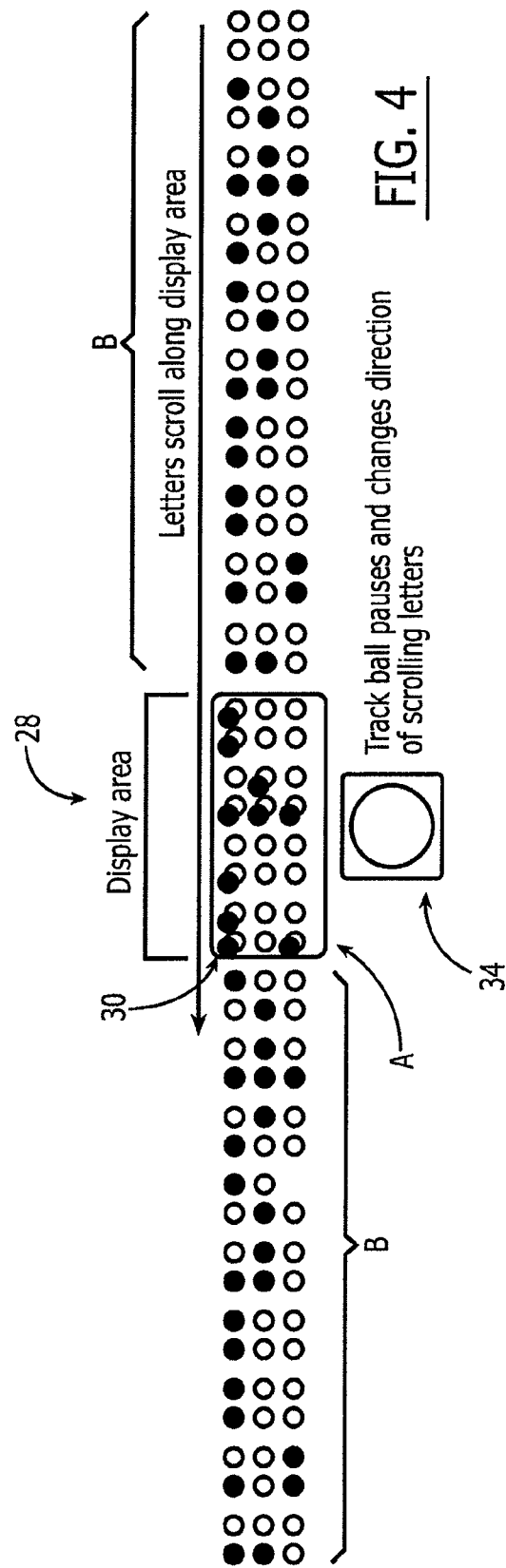
FIG. 4 illustrates a method of scrolling a Braille display, such as that depicted in FIG. 2.

FIG. 4 illustrates the scrolling of the Braille text with a control device 34. In FIG. 4, a track ball represents the control device 34. That portion of the stream of Braille text that is displayed via the Braille display 28 is controlled by the control device 34. FIG. 4 shows Braille text A that is being physically displayed and Braille text B that precedes and follows the displayed Braille text A, but is not being physically displayed. Therefore, Braille text B is not currently available via the Braille display. The displayed Braille text A may be represented by pins 30 that are electronically controlled, such as by the processor 38 to move in and out relative to the housing surface. Although Braille text may be displayed in various manners, the various combinations of pin 30 positions (e.g., in or out) for the pins 30 of a cell 32 define a plurality of unique and recognizable Braille characters. As such, a user may touch the pins 30 of a cell 32 in order to determine the Braille character represented by the cell 32. By using the control device 34, the Braille text B may be moved into and displayed in Braille display 28, while at least a portion of the previously displayed Braille text A may move out of the window and no longer be displayed by the Braille display 28. In this way, the control device 34 may allow a user to scroll the Braille text and read the Braille text as portions are displayed in the Braille display 28. With reference to FIG. 4 in which the Braille text proceeds from prior text at the left to later text at the right, the track ball may be rolled to the right to display and read successive portions of the Braille text. Conversely, the track ball may be rolled to the left to display and read (or re-read) prior portions of the Braille text. While the control device 34 may be used to control the Braille text, the Braille display 28 may display an ongoing conversation or other form of a message without input from the control device 34. Instead, the user may read the ongoing conversation or other form of message as the conversation or message progresses, like a stream of Braille text. Thus, the Braille display 28 may display Braille text as the data is received or soon thereafter. Similarly, the conversation or message may be displayed in the Braille display 28, without the use of a control device 34, at a later time. Of course, this would be particularly advantageous for synchronous forms of communication.

Figure 5:
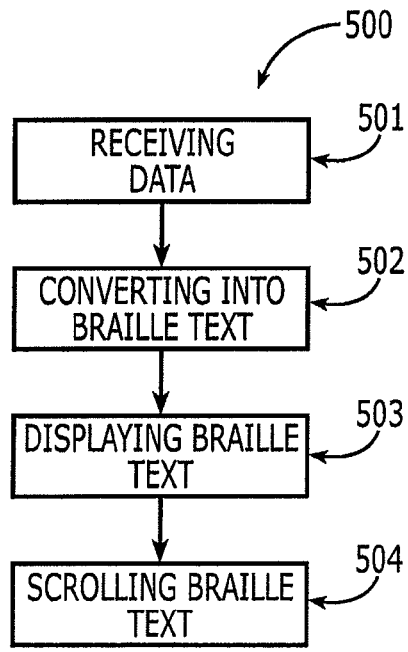
FIG. 5 is a flow chart illustration of a method according to one embodiment.

FIG. 5 is an example of a method for converting data from other sources into Braille text 500 for presentation by the Braille display 28. First, the apparatus 10 receives data 501 from an external source. The data may represent text and/or voice messages, which may include an ongoing voice conversation, an instant messaging session, or other synchronous types of communication but also may include emails or other communication that is not synchronous, from a remote computer, telephone, or other communication device. The data may also include television shows, radio shows, or various other forms of media. The data may be received wirelessly by the antenna 14 or the like. Alternatively, sounds or other data may be received by the microphone 22. For example, sounds from a television or radio may be received by the microphone. Then, the data is transferred, such as by way of communication circuitry 36, to a processor 38. The processor 38 converts at least a portion of the data into Braille text 502. The processor 38 may operate under control of software stored in the memory device 40 to convert speech, text, and/or other data into Braille text, in accordance with a predefined conversion algorithm. The Braille text may then optionally be stored in a memory device 40. Next, at least a portion of the Braille text may be displayed 503 within a Braille display 28. The Braille text is displayed as unique patterns of raised pins 30 within a Braille display 28. Typically, the Braille text is also displayed under control of the processor 38. As described, a user may be able to at least partially control scrolling of Braille text 504 with a control device 34 in order to view different portions of the Braille text as described above in relation to FIG. 4. Scrolling may include a control device 34 that allows for controlling variations in the speed and direction of the Braille text. It may also permit pausing of the variations in the speed and direction of scrolling of the Braille text. For example, controlling scrolling of Braille text 504 may include rolling a track ball. As noted above, the processor 38 may receive the input from the control device 34 and adjust the Braille text presented by the Braille display 28 correspondingly.

Figure 6:
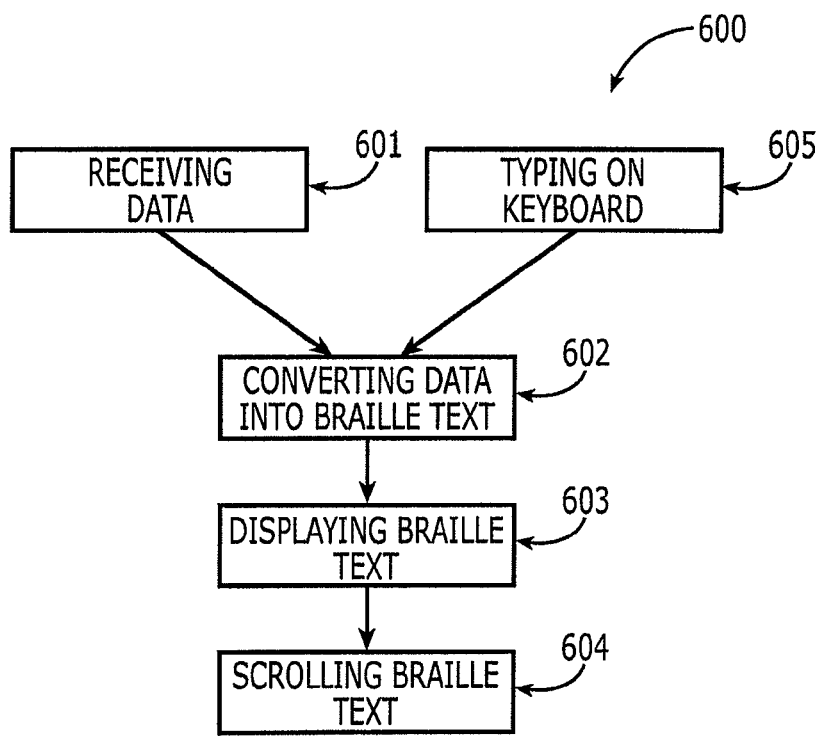
FIG. 6 is a flow chart illustration of a method according to another embodiment.

FIG. 6 is an example of a method for converting data from a keyboard and/or other sources into Braille text 600. Unlike FIG. 5, FIG. 6 illustrates a method where keyboard entries 605 are made on a keyboard 20 of the apparatus 10. The keyboard entry data, along with voice and/or text data from other sources, are converted into Braille text 602 by the processor 38. The Braille text is then displayed 603 in a Braille display 28. Finally, a user may control scrolling of the Braille text 604 in the Braille display 28 by using a control device 34. Thus, a user may input keyboard data 605 and read the inputted data on the Braille display 28, such as prior to saving and/or transmitting the keyboard data.

It is understood that the operations described for the illustrated method of FIGS. 5 and 6 may be performed through hardware, software, or a combination thereof. Therefore embodiments may take the form of hardware systems and/or apparatuses, software, or combinations thereof. As an example, embodiments may include a computer program product that includes a computer-readable storage medium (e.g., memory) and one or more executable portions (e.g., software) stored by the computer-readable storage medium for performing the operations described herein upon execution thereof. For example, the executable portions may be stored in the memory device 40 of the apparatus of FIG. 3 such that the processor 38 may access and execute the executable portions of the computer program product in order to perform the functions described herein including, for example, those depicted in FIGS. 5 and 6 and described above.

In the preceding specification, various embodiments of the claimed invention have been described. It will, however, be evident that various modifications and changes may be made thereunto without departing from the broader spirit and scope of the invention as set forth in the claims that follow. For example, while the Braille display has been shown to scroll left to right, the Braille display can scroll in other directions, such as top to bottom. The specification and drawings are accordingly to be regarded as an illustrative rather than restrictive sense.

That which is claimed:

1. A mobile communication device comprising:
a Braille display to present Braille text;
a control device to allow a user to at least partially control scrolling of the Braille text presented by the Braille display;
communication circuitry to wirelessly receive data; and
a processor that is coupled to the Braille display and the communication circuitry, the processor to:
convert the data, wirelessly received by the communication circuitry, into converted Braille text, provide a first portion of the converted Braille text to the Braille display for presentation to the user, scroll, in a first direction, the converted Braille text to provide to the Braille display, for presentation to the user, a second portion of the converted Braille text after providing the first portion,
the converted Braille text being scrolled without receiving user input to scroll the converted Braille text,
the converted Braille text being scrolled at a first speed, and
the second portion replacing the first portion within the Braille display, receive, via the control device, user input to control scrolling of the converted Braille text, after providing the second portion, and scroll, based on receiving the user input, the converted Braille text to provide, to the Braille display for presentation to the user, the first portion and the second portion,
the converted Braille text being scrolled, based on receiving the user input, at a second speed different than the first speed and in a second direction different than the first direction.

2. The mobile communication device of claim 1, further comprising a memory device to:
receive the converted Braille text from the processor, and
store the converted Braille text.

3. The mobile communication device of claim 1, where the Braille display presents a plurality of cells representing respective Braille characters.

4. The mobile communication device of claim 1, where the control device comprises at least one of a track ball, a joystick, or a touchpad.

5. The mobile communication device of claim 1, further comprising:
a housing comprising a first portion and a second portion opposite the first portion,
the first portion comprising:
a screen to display visual data; and
the second portion comprising:
the Braille display; and
the control device.

6. The mobile communication device of claim 5, where the first portion further comprises a keypad coupled to the processor, the keypad allowing a user to select key entries.

7. The mobile communication device of claim 1, where the wirelessly received data comprises audio and textual content,
where the processor is further to convert the audio and textual content into the converted Braille text, and
where the Braille display is further to present the converted Braille text converted from the audio and textual content.

8. A mobile device comprising:
a housing comprising a first portion and a second portion opposite the first portion,
the first portion comprising:
a keypad to receive key entries selected by a user; and
the second portion comprising:
a Braille display to present Braille text;
a control device to allow the user to at least partially control scrolling of the Braille text presented by the Braille display; and
a processor that is coupled to the Braille display and the keypad, the processor to:
convert the key entries, selected by the user, into converted Braille text, provide a first portion of the converted Braille text to the Braille display for presentation to the user, scroll, in a first direction, the converted Braille text to provide to the Braille display, for presentation to the user, a second portion of the converted Braille text, after providing the first portion,
the converted Braille text being scrolled without receiving user input to scroll the converted Braille text,
the converted Braille text being scrolled at a first speed, and
the second portion replacing the first portion within the Braille display, receive, via the control device, user input to control scrolling of the converted Braille text, after providing the second portion, and scroll, based on receiving the user input, the converted Braille text to provide, to the Braille display for presentation to the user, the first portion and the second portion,
the converted Braille text being scrolled, based on receiving the user input, at a second speed different than the first speed and in a second direction different than the first direction.

9. The mobile device of claim 8, where the control device comprises at least one of a track ball, a joystick, or a touchpad.

10. The mobile device of claim 9, further comprising communication circuitry,
where the communication circuitry is to transmit and receive data.

11. The mobile device of claim 8, where the Braille display presents a plurality of cells representing respective Braille characters.

12. The mobile device of claim 8, further comprising a memory device to:
receive Braille text from the processor,
store the Braille text.

13. A method comprising:
receiving data of a communication session at a mobile device, the communication session including an instant messaging session or an ongoing voice conversation;
converting, by the mobile device, the received data into converted Braille text;
presenting for display, by the mobile device, a first portion of the converted Braille text within a Braille display of the mobile device;
scrolling, by the mobile device and in a first direction, the converted Braille text to present for display a second portion of the converted Braille text within the Braille display, after presenting the first portion,
the converted Braille text being scrolled to present, for display, the second portion without receiving user input to scroll the converted Braille text
the converted Braille text being scrolled at a first speed, and
the second portion replacing the first portion within the Braille display;
receiving, by the mobile device and after presenting the second portion, user input to control scrolling of the converted Braille text within the Braille display; and
scrolling, by the mobile device and based on the received user input, the converted Braille text to present for display, within the Braille display, the first portion and the second portion, the converted Braille text being scrolled, based on the received user input, at a second speed different than the first speed and in a second direction different than the first direction.

14. The method of claim 13, where receiving the user input includes receiving the user input via a control device of the mobile device.

15. The method of claim 13, where the received user input corresponds to a first user input,
the method further comprising:
receiving a second user input; and
pausing scrolling of the converted Braille text based on the received second user input.

16. The method of claim 13, further comprising:
receiving key entries from a keyboard of the mobile device;
converting the key entries, from the keyboard, into converted other Braille text; and
presenting the converted other Braille text for display within the Braille display.

17. The method of claim 13, further comprising:
wirelessly receiving data from another mobile device;
converting the wirelessly received data to converted other Braille text;
presenting for display the converted other Braille text;
receiving a response to the converted other Braille text; and
transmitting the response to the other mobile device received data.

18. The mobile communication device of claim 1, where the wirelessly received data comprises at least one of a plurality of text messages included in a text messaging session, a plurality of voice messages included in an ongoing voice conversation, or a plurality of emails,
where the processor is further to convert at least portions of the plurality of text messages, the plurality of voice messages, or the plurality of emails into the converted Braille text as the plurality of text messages, the plurality of voice messages, or the plurality of emails are received, and
where the Braille display is to present the converted Braille text, converted from the at least portions of the plurality of text messages, the plurality of voice messages, or the plurality of emails, to the user.

19. The mobile device of claim 8, where the processor is further to convert data, wirelessly received at the mobile device, to converted other Braille text, the received data comprising at least one of a plurality of text messages, a plurality of voice messages, or a plurality of emails,
where the Braille display is to present the converted other Braille text to the user, and
where the key entries are selected by the user when the user responds to the converted other Braille text presented by the Braille display.

20. The mobile device of claim 8, where the received user input corresponds to a first user input, and
where the processor is further to:
receive a second user input, and
pause scrolling of the converted Braille text based on the received second user input.

21. The mobile device of claim 8, where the processor is further to:
convert data, wirelessly received by the mobile device, to converted other Braille text, the data being received from another mobile device,
present for display the converted other Braille text,
receive a response to the converted other Braille text, and
transmit the response to the other mobile device.

* * * * *